United States Patent [19]

Schelkmann

[11] 3,793,116
[45] Feb. 19, 1974

[54] RECAPPING OF TIRES

[76] Inventor: Wilhelm Schelkmann, Grengeldanzstrasse 85a, Witten, Ruhr, Germany

[22] Filed: Feb. 4, 1971

[21] Appl. No.: 112,816

Related U.S. Application Data

[63] Continuation of Ser. No. 713,514, March 15, 1968, abandoned.

[52] U.S. Cl............ 156/394, 156/96, 264/36, 264/315, 425/19, 425/43, 425/45
[51] Int. Cl.................... B29h 5/04, B29h 17/36
[58] Field of Search ........... 156/394, 96; 277/236; 270/46 MS; 264/36, 315; 425/19, 43, 45

[56] References Cited
UNITED STATES PATENTS

| 3,207,647 | 9/1965 | Schelkmann | 156/394 |
| 3,325,326 | 6/1967 | Schelkmann | 156/96 |
| 3,317,224 | 5/1967 | Kuskevics et al. | 220/46 MS |
| 3,101,191 | 8/1963 | Wolfensperger | 220/46 MS |

FOREIGN PATENTS OR APPLICATIONS

| 1,283,171 | 12/1961 | France | 277/236 |

Primary Examiner—Clifton B. Cosby
Attorney, Agent, or Firm—Michael S. Striker

[57] ABSTRACT

An envelope which is applied around a tire to surround at least that portion of the tire which requires recapping or other repair. The envelope comprises an elastic wrapper which has a marginal portion overlapping another portion of the wrapper or a portion of the tire and a sealing ring interposed between such portions and having an annular edge which bears against the adjoining surface to provide a fluidtight seal. The edge is urged against the adjoining surface in response to evacuation of gas from the area between the wrapper and the tire. The sealing action of the ring can be enhanced by employing a clamping ring which biases a portion of the wrapper against a portion of the sealing ring at one or both sides of the edge. The sealing ring may form an integral part of the wrapper or it may constitute a discrete part which is inserted between two portions of the wrapper or between the wrapper and the tire.

8 Claims, 13 Drawing Figures

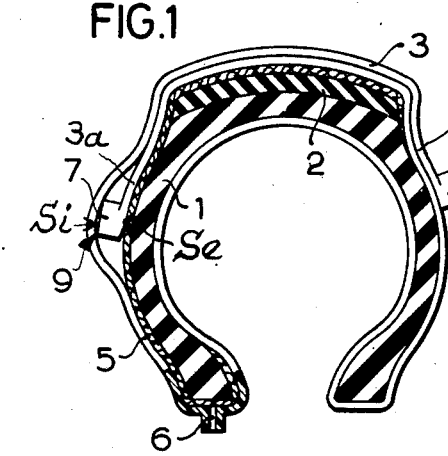
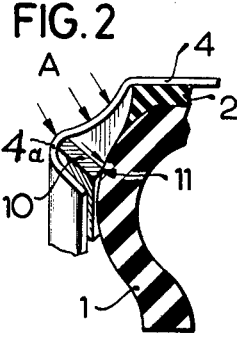
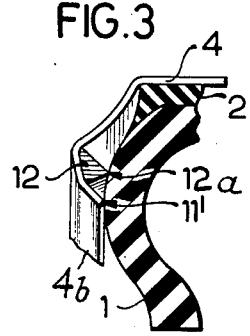
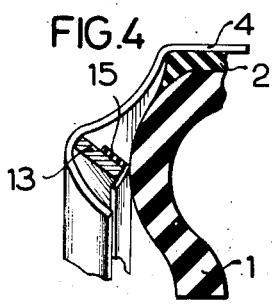
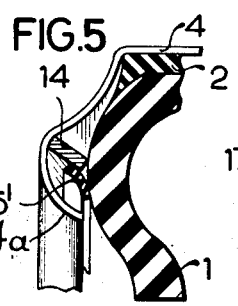
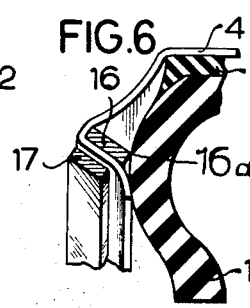
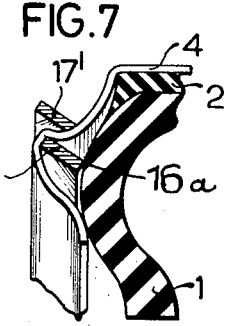
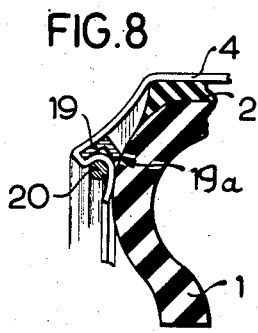
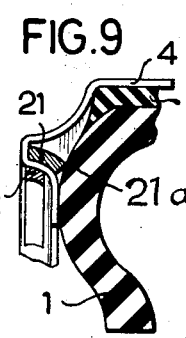
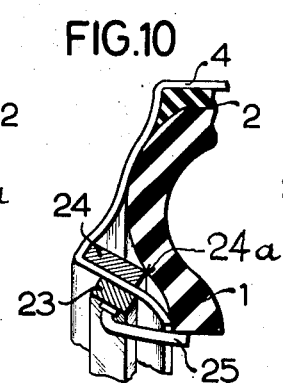
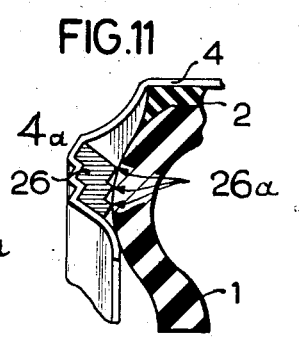
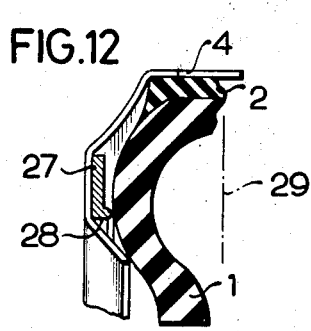
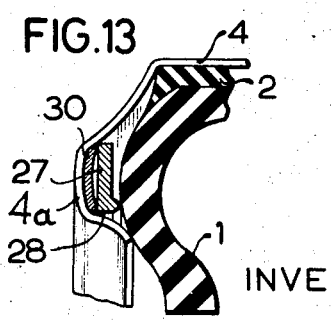

RECAPPING OF TIRES

This application is a continuation of Ser. No. 713,514, filed Mar. 15, 1968, now abandoned.

BACKGROUND OF THE INVENTION

The present invention relates to recapping or repairing of inflatable or solid tires for automotive vehicles, particularly for automobiles and aircraft. More particularly, the invention relates to improvements in repairing or recapping of tires in accordance with methods which are disclosed in my U.S. Pat. Nos. 2,966,936 and 3,325,326. Still more particularly, the invention relates to improvements in the construction, design and mode of utilizing envelopes which are applied around tires prior to vulcanizing in an autoclave or the like.

My aforementioned patents disclose methods of repairing or recapping tires by employing an envelope which is applied around portions of or around entire tires and is evacuated prior to vulcanizing. In response to such evacuation, the envelope is pressed against the adjoining portion or portions of the tire. My present invention is concerned with improvements in such envelopes, and particularly with improvements in sealing means which prevents flow of gases or other fluids from the enclosed area to the exterior of the envelope or vice versa.

SUMMARY OF THE INVENTION

It is an object of my invention to provide a simple, inexpensive and reliable envelope which can establish a fluidtight seal around portions of or around entire tires during recapping or repair in an autoclave or the like.

Another object of the invention is to provide the envelope with novel sealing means which prevents communication between the enclosed area within the envelope and the surrounding atmosphere.

A further object of the invention is to provide an envelope wherein the sealing action of the novel sealing means is improved with progressing evacuation of air from the interior of the envelope.

An additional object of the invention is to provide an envelope which can be used in connection with repairing or recapping of solid or inflatable tires of any desired size.

A concomitant object of the invention is to provide a reusable envelope of the above outlined character.

An ancillary object of the invention is to provide an envelope which can establish a plurality of reliable seals between its portions or between a portion of the envelope and a portion of the tire.

The improved envelope is used for repairing or recapping of tires wherein an elastic wrapper of the envelope encloses at least a portion of the tire to form therewith an assembly and has at least one annular marginal portion having an internal surface adjacent to an annular external surface of the assembly. The external surface can be provided on an overlapped portion of the envelope or on a portion of the tire proper. The improvement consists in the provision of annular sealing means located between the internal and external surfaces and having at least one annular edge which bears against and provides with one of such surfaces a seal to prevent passage of gas into the area between the wrapper and the tire upon evacuation of gas from such area.

The sealing means may comprise a ring or bead which is integral with the wrapper or one or more discrete sealing rings having one, two or more annular edges which bear against the adjoining surface to form therewith a fluidtight seal. The wrapper preferably consists of elastic material, and the sealing action of the sealing ring can be enhanced by utilizing one or more clamping rings which are applied around the wrapper to press a portion of the wrapper against a face of the sealing ring.

The novel features which are considered as characteristic of the invention are set forth in particular in the appended claims. The improved envelope itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary axial sectional view of an assembly which includes a tire and an envelope having a wrapper which fully encloses the tire;

FIG. 2 is a fragmentary axial sectional view of a modified assembly wherein the wrapper encloses a portion of the tire and the envelope further comprises discrete sealing rings of rectangular cross-sectional outline;

FIG. 3 is a similar fragmentary axial sectional view of a third assembly wherein the sealing ring has a triangular cross-sectional outline and the wrapper surrounds only a portion of the tire;

FIG. 4 is a similar axial fragmentary sectional view of an assembly wherein an elastic lip is interposed between the sealing ring and the carcass of the tire;

FIG. 5 illustrates a modification of the structure shown in FIG. 4 wherein the elastic lip is inserted between the wrapper and the carcass;

FIG. 6 is a fragmentary axial sectional view of an assembly wherein a clamping ring biases a portion of the wrapper against the sealing ring;

FIG. 7 illustrates a modification of the structure shown in FIG. 6 wherein the clamping ring engages the wrapper downstream of the line of engagement between the sealing ring and the carcass of the tire;

FIG. 8 is a fragmentary axial sectional view of an assembly wherein a clamping ring of circular cross section bears against the wrapper opposite a concave face of the sealing ring;

FIG. 9 is a similar view of an assembly wherein the clamping ring is of polygonal outline and has a convex face in sealing engagement with the wrapper opposite the sealing ring;

FIG. 10 is a fragmentary axial sectional view of an assembly wherein the clamping ring cooperates with one or more mechanical biasing devices which engage with the bead of the carcass;

FIG. 11 is a fragmentary axial sectional view of an assembly wherein the sealing ring is provided with several annular edges which bear against the external surface of the carcass;

FIG. 12 is a fragmentary axial sectional view of an assembly wherein the sealing ring is located in a plane which is normal to the axis of the carcass; and FIG. 13 illustrates a modification of the structure shown in FIG. 12.

DESCRIPTION OF THE PREFERRED EMBODIMENTS

FIG. 1 shows a tire having a carcass 1 which is to be provided with a new tread 2. These parts form with an elastic wrapper 3 of rubber or the like an assembly wherein the wrapper completely encloses the tire and has two annular marginal portions 3a, 3b. In order to facilitate evacuation of air from the area between the wrapper 3 and the carcass 1 and new tread 2, a non-compressible layer 5 of air-permeable material is applied at least around those portions of the parts 1, 2 which are to be bonded to each other in an autoclave. For example, the layer 5 may be a polyamide filter or the like. The dimensions of the layer 5 depend on the dimensions of the area from which air must be withdrawn prior to vulcanizing. Evacuation of air takes place through one or more one-way valves 6 provided in the wrapper 3. It is clear that the valve or valves 6 need not be provided in the region of the bead or beads on the carcass 1.

In accordance with my invention, the envelope which includes the wrapper 3 further comprises sealing means 7 constituting an enlarged or thickened annular portion or ring provided on the marginal portion 3a of the wrapper and having an annular edge 9 which penetrates into or bears against the internal surface of the wrapper 3 in response to evacuation of air from the area surrounded by the wrapper. The sealing means 7 is shown as being integral with the wrapper 3 and is interposed between an annular external surface Se of the assembly 1–3 and an annular internal surface Si of an intermediate portion of the wrapper. In the embodiment of FIG. 1, both such surfaces are provided on the wrapper 3 because the latter fully encloses the carcass 1 and new tread 2. The sealing means 7 is of substantially rectangular cross sectional outline and may be formed by rolling the marginal portion 3a or by welding or otherwise bonding a separately produced sealing ring to the marginal portion 3a.

The other marginal portion 3b is provided with similar sealing means 7′.

FIG. 2 illustrates a portion of a modified assembly including a carcass 1, a new tread 2 which is to be vulcanized to the carcass, and an envelope including a wrapper 4 and an annular sealing member or ring 10 which is a separate part and is interposed between the internal surface of a marginal portion 4a on the wrapper and the external surface of the carcass 1. The other marginal portion (not shown) of the wrapper 4 cooperates with a second sealing ring 10 to provide a second annular seal along the other side of the carcass 1. The filter 5 has been omitted in FIG. 2 (and also in FIGS. 3–13) for the sake of clarity. The same holds true for the valve or valves 6.

The ring 10 of FIG. 2 resembles the hoop of a barrel and has an annular edge 11 which bears against the external surface of the carcass 1 in response to evacuation of air from the area between the wrapper 4 and the adjoining portion of the tire. The direction in which external air applies pressure against the wrapper 4 in order to hold the edge 11 in sealing engagement with the external surface of the carcass 1 is indicated by arrows A. The ring 10 is of rectangular cross-sectional outline and its longer sides extend substantially radially with reference to the sides of the carcass 1. The external pressure (arrows A) is assisted by suction in the interior of the wrapper to produce a very satisfactory sealing action between the edge 11 and the carcass.

The wrapper 4 surrounds the tread 2 and portions of sides of the carcass 1. Its elastic marginal portion 4a tends to turn the sealing ring 10 about the edge 11 to thus enhance the sealing action between the ring and the adjoining external surface of the carcass.

FIG. 3 shows a sealing ring 12 of triangular cross-sectional outline having an apex providing an annular edge 12a which cooperates with the external surface of the carcass to seal the area between the wrapper 4 and the tire against penetration of air. The innate elasticity of the wrapper 4 urges the latter's annular end portion 4b against the carcass to provide a secondary annular seal 11′ which is located upstream of the edge 12a as considered in the direction in which air tends to penetrate into the space between the wrapper and the tire.

The sealing ring 13 of FIG. 4 transmits to the external surface of the carcass 1 sealing pressure by way of an elastic insert or lip 15 of rubber or the like. In FIG. 5, an elastic lip or insert 15′ is placed between the annular end portion 4a of the wrapper 4 and the external surface of the carcass 1 upstream of the sealing ring 14. The purpose of lips 15, 15′ is to furnish a preliminary mechanical sealing action prior to evacuation of air from the area between the wrapper 4 and the tire, i.e., prior to establishment of sealing action between the sealing ring 13 or 14 and the wrapper 4 or carcass 1.

FIG. 6 illustrates different sealing means which comprises a sealing ring 16 operating between the wrapper 4 and carcass 1, and a clamping ring 17 which is applied over the wrapper opposite the ring 16. The ring 17 bears against the wrapper and maintains the latter in sealing engagement with the ring 16. The edge 16a of the ring 16 bears against the external surface of the carcass in response to evacuation of air from the area between the tire and the wrapper. The clamping ring 17 causes the wrapper to bear against a side of the sealing ring 16 which is located upstream of the edge 16a.

In FIG. 7, the clamping ring 17′ pinches a portion of the wrapper 4 against a surface of the sealing ring 16 which is located downstream of the edge 16a.

The clamping rings 17, 17′ prevent slippage of the wrapper 4 with reference to the sealing ring 16.

FIG. 8 shows a sealing ring 19 having a concave face located opposite a clamping ring 20 of circular cross-sectional outline. The ring 20 clamps a portion of the wrapper 4 against the concave face of the sealing ring 19 upstream of the edge 19a. The ring 20 contributes to superior sealing action between the edge 19a and the external surface of the carcass 1.

In FIG. 9, the clamping ring 22 is of polygonal cross-sectional outline and has a convex face which presses a portion of the wrapper 4 against a concave face of the sealing ring 21 upstream of the edge 21a.

In FIG. 10, the action of the clamping ring 23 is assisted by one or more mechanical clamping or biasing means 25 which engage the bead of the carcass 1. The pressure applied by the biasing means 25 is transmitted to a portion of the wrapper 4 which bears against the adjoining face of the sealing ring 24 to urge the latter's edge 24a against the external surface of the carcass. The biasing means 25 may be a one-piece body or it may comprise an annulus of clamping elements operating between the bead of the carcass and the clamping ring 23.

FIG. 11 shows a sealing ring 26 which is provided with three annular edges 26a bearing against the external surface of the carcass 1. This sealing ring is also provided with a serrated outer face having several annular edges which engage the internal surface of the marginal portion 4a on the wrapper 4. The one-piece sealing ring 26 can be replaced by a stack of two or more discrete sealing rings.

FIG. 12 shows a flat sealing ring 27 of ferrous or other metallic material disposed in a plane which is normal to the axis of the carcass 1. An annular projection 28 of the ring 27 has a sharp edge which bears against the external surface of the carcass to furnish a desirable sealing action in response to evacuation of air from the area between the wrapper 4 and the tire. The projection 28 is provided at the smaller-diameter end of the sealing ring 27. The numeral 29 denotes the central symmetry plane of the tire, and such plane is substantially parallel to the plane of the sealing ring 27. The sealing ring 27 occupies very little room and its projection 28 furnishes a highly satisfactory sealing action because the wrapper 4 bears against a large portion of the sealing ring.

In order to protect the wrapper 4 against damage, the sealing means may include a concave-convex cushion 30 (FIG. 13) which is interposed between the internal surface of the marginal portion 4a of the wrapper and the outer face of the sealing ring 27. The projection 28 can form an integral part of the sealing ring 27 but it is also possible to weld or to otherwise affix this projection to the smaller-diameter portion of the sealing ring.

Discrete sealing rings (see FIGS. 2–13) are preferably employed when the wrapper (4) encloses only a portion of the tire. The edge or edges of such rings are biased against the adjoining surfaces due to elasticity of the wrappers, due to evacuation of air from the area which is enclosed by a wrapper, and/or due to the provision of one or more clamping rings.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

1. In an envelope for use in recapping of a tire having a lateral annular surface and a circumferential face spaced from said annular surface and having a fresh tread placed thereon to form with said tire an assembly wherein an elastic wrapper encloses at least a portion of said tire and said fresh tread and comprises at least one annular marginal portion having an internal surface adjacent to said lateral annular surface of said tire, the improvement which consists in the provision of annular sealing means including a discrete rigid sealing ring interposed between said surfaces and having inner and outer sharp annular edge faces which bear against and provide with said surfaces a circumferentially complete seal to prevent penetration of gas into the area between said wrapper and said portion of said tire upon evacuation of gas from said area.

2. The improvement as defined in claim 1, wherein said lateral surface of the tire is a smooth surface.

3. The improvement as defined in claim 1, wherein said sealing ring is a hoop-shaped ring of polygonal cross-sectional outline.

4. The improvement as defined in claim 1, wherein said sealing ring comprises a plurality of annular edges bearing against said one surface.

5. The improvement as defined in claim 1, wherein said sealing means further comprises a clamping ring arranged to bias a portion of said wrapper against said sealing ring, and mechanical biasing means operating between the tire and said clamping ring to urge the clamping ring against said portion of the wrapper.

6. The improvement as defined in claim 5, wherein the tire has a bead and said biasing means engages said bead.

7. The improvement as defined in claim 1, wherein said sealing ring is disposed in a plane which is substantially normal to the axis of the tire and has an annular projection provided with said one edge.

8. The improvement as defined in claim 1, wherein at least a portion of said sealing means consists of a metallic material.

* * * * *